(12) United States Patent
Marsh

(10) Patent No.: US 11,925,172 B2
(45) Date of Patent: Mar. 12, 2024

(54) AUTOMATED PET BOWL APPARATUS

(71) Applicant: Angela Marsh, East Pittsburgh, PA (US)

(72) Inventor: Angela Marsh, East Pittsburgh, PA (US)

( * ) Notice: Subject to any disclaimer, the term of this patent is extended or adjusted under 35 U.S.C. 154(b) by 0 days.

(21) Appl. No.: 17/479,796

(22) Filed: Sep. 20, 2021

(65) Prior Publication Data
US 2022/0087216 A1 Mar. 24, 2022

Related U.S. Application Data

(60) Provisional application No. 63/080,106, filed on Sep. 18, 2020.

(51) Int. Cl.
*A01K 5/02* (2006.01)
*A01K 5/01* (2006.01)
*A01K 7/06* (2006.01)

(52) U.S. Cl.
CPC ............ *A01K 5/025* (2013.01); *A01K 5/0142* (2013.01); *A01K 7/06* (2013.01)

(58) Field of Classification Search
None
See application file for complete search history.

(56) References Cited

U.S. PATENT DOCUMENTS

| | | | | |
|---|---|---|---|---|
| 2006/0249089 A1* | 11/2006 | Behunin | ................. | A01K 5/01 |
| | | | | 119/61.57 |
| 2007/0125306 A1* | 6/2007 | Beecher | ................. | A01K 5/02 |
| | | | | 119/51.2 |
| 2012/0299731 A1* | 11/2012 | Triener | ................. | G01G 19/00 |
| | | | | 340/573.1 |
| 2015/0040832 A1* | 2/2015 | Klein | ...................... | A01K 5/02 |
| | | | | 119/51.11 |

* cited by examiner

*Primary Examiner* — Joshua J Michener
*Assistant Examiner* — Henry Hooper Mudd
(74) *Attorney, Agent, or Firm* — Michael L. Greenberg, Esq.; Greenberg & Lieberman, LLC

(57) ABSTRACT

A pet bowl system and apparatus equipped with an immobilized base, bowls, and automated lid is described. The system employs a series of mounts to ensure that the base remains in a fixed position. The system is configured for use indoors or outdoors by conventional domesticated animals. A proximity-triggered automatic lid is present atop the base which is configured to prevent the introduction of contaminants to the contents of the bowls, as well as to prevent use of the system by unwanted animals and pests. An RFID reader is preferably disposed within the base which is configured to communicate with an RFID tag placed on the collar of the pet. The lid opens upon approach of the pet, and is closed upon departure of the pet from the system.

15 Claims, 5 Drawing Sheets

AUTOMATED PET BOWL APPARATUS

CONTINUITY

This application is a non-provisional patent application of provisional patent application No. 63/080,106, filed on Sep. 18, 2020, and priority is claimed thereto.

FIELD OF THE PRESENT INVENTION

The present invention relates to the field of pet feeding systems, and more specifically relates to a pet food and drink apparatus configured to maintain the safety and integrity of the contents of pet bowls via an immobilized pet bowl stand equipped with an optional proximity-triggered lid system.

BACKGROUND OF THE PRESENT INVENTION

It is known that pets as well as all domestic animals are conventionally fed by an owner at least once per day. Often, a bowl or trough system is used to facilitate feeding of the animal(s). Bowls are a convenient means by which a pet owner may feed a domestic animal both indoors and outdoors.

Unfortunately, such pet bowls are prone to contamination from debris, bugs, and curious children. Additionally, some pets such as large dogs can inadvertently knock over and/or spill their pet bowls during play, or even during the act of eating if overly excited. If there were a pet bowl system which could minimize contaminants while effectively retaining the pet bowls in position to prevent spillage, pet feeding and the maintenance of the pet bowls could be simplified and expedited.

Likewise, dirt and debris can enter pet bowls when the pet moves the bowls around. Usually, the bowls are not secured to the ground or floor, meaning that an excited or very hungry pet may move the bowl(s) with his or her snout during eating, or just for fun. If there were a way to secure the pet bowls to the ground and/or floor, the bowls would remain stationary and would be less prone to contamination or flipping over.

Thus, there is a need for a new pet feeding apparatus and system configured to securely maintain the pet bowls in a stationary, upright position. Such an apparatus preferably employs a pet bowl base which may be mounted to the ground or floor via spikes, suction cups, or similar mounting mechanisms. Additionally, such a pet bowl system may be equipped with a proximity-triggered, RFID equipped lid which is configured to open automatically upon the detection of the pet via an RFID proximity tag disposed on the collar of the pet. Similarly, such a lid is preferably configured to automatically close once the presence of the pet is no longer detected, minimizing contamination and debris within the pet food bowl and pet water bowl. The automatic lid helps to protect the food and water from environmental elements as well as insects and wildlife such as rodents, raccoons, feral dogs/cats, and other animals. Additionally, the automatic lid helps to prevent the waste of food, saving the pet owner money. When the system is used indoors, the automatic lid helps to keep small children from playing in, or eating the food.

SUMMARY OF THE PRESENT INVENTION

The present invention is a pet bowl system and apparatus configured to maintain a pair of pet bowls in a stationary position. The system is designed for use indoors or outdoors, and is equipped with multiple mounting mechanisms (including suction cups and ground spikes) to facilitate mounting a base of the system to a floor or the ground in accordance with the user's desired placement location. The base is preferably removable from a primary body of the apparatus, which houses the bowls. An automatic lid is preferably disposed atop the base, and is configured to open and close automatically upon the detection of the presence of the pet. As such, the base is preferably outfitted with at least one motor and a power source to facilitate the opening and closing of the lid. Additionally, a proximity-based tag system, such as NFC or RFID, is preferably employed to enable the base to detect the presence of the pet. Therefore, the pet preferably wears an RFID tag on his/her collar, and an RFID reader is integrated into the base. The automatic lid is configured to minimize the presence of contaminants while keeping out pests and other animals.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
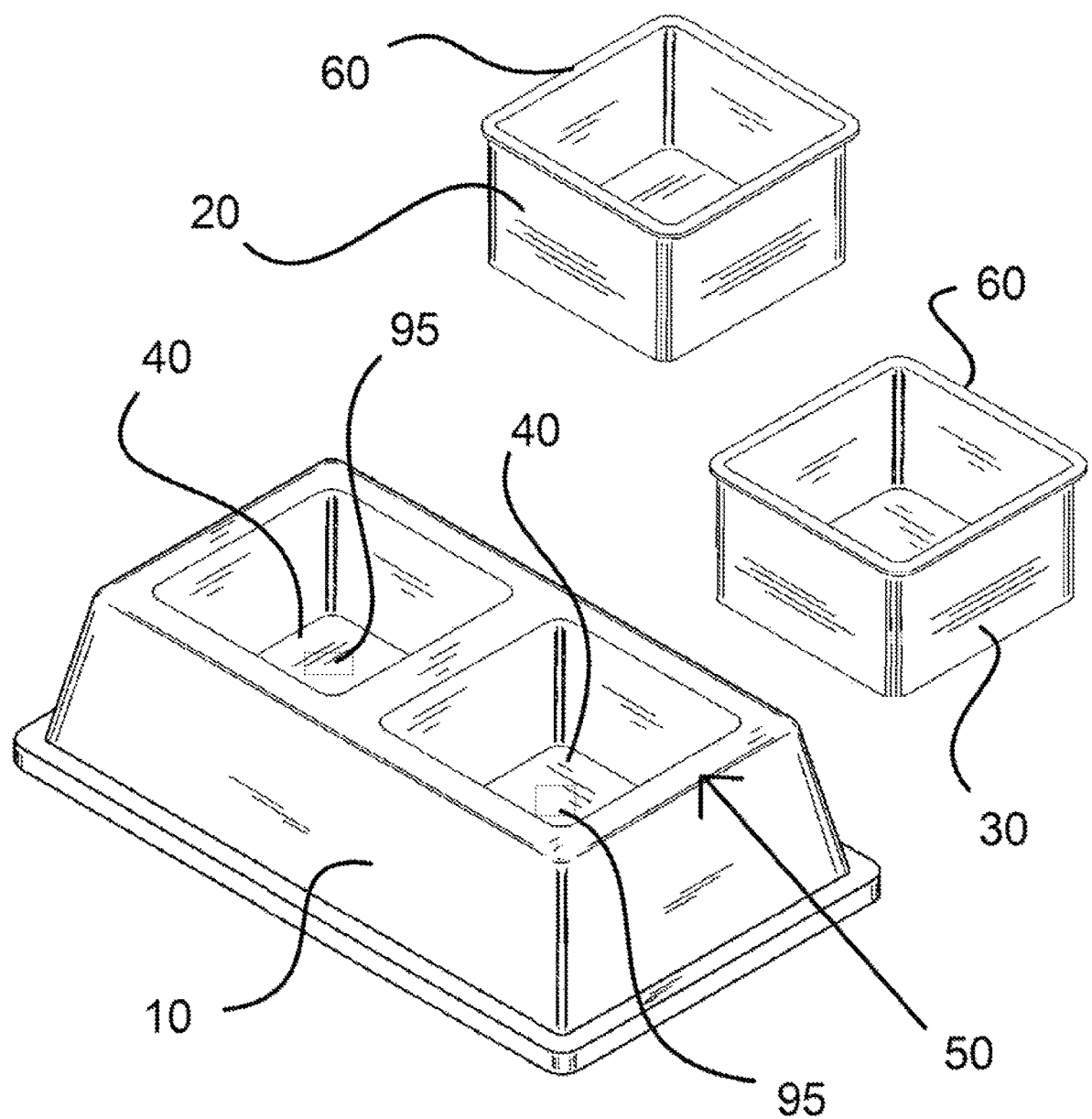
FIG. 1 depicts a view of the apparatus of the present invention as seen from the front and side, with the first removable bowl and second removable bowl separated from the cavities of the present invention, and with the lid detached from the base.
Figure 2:
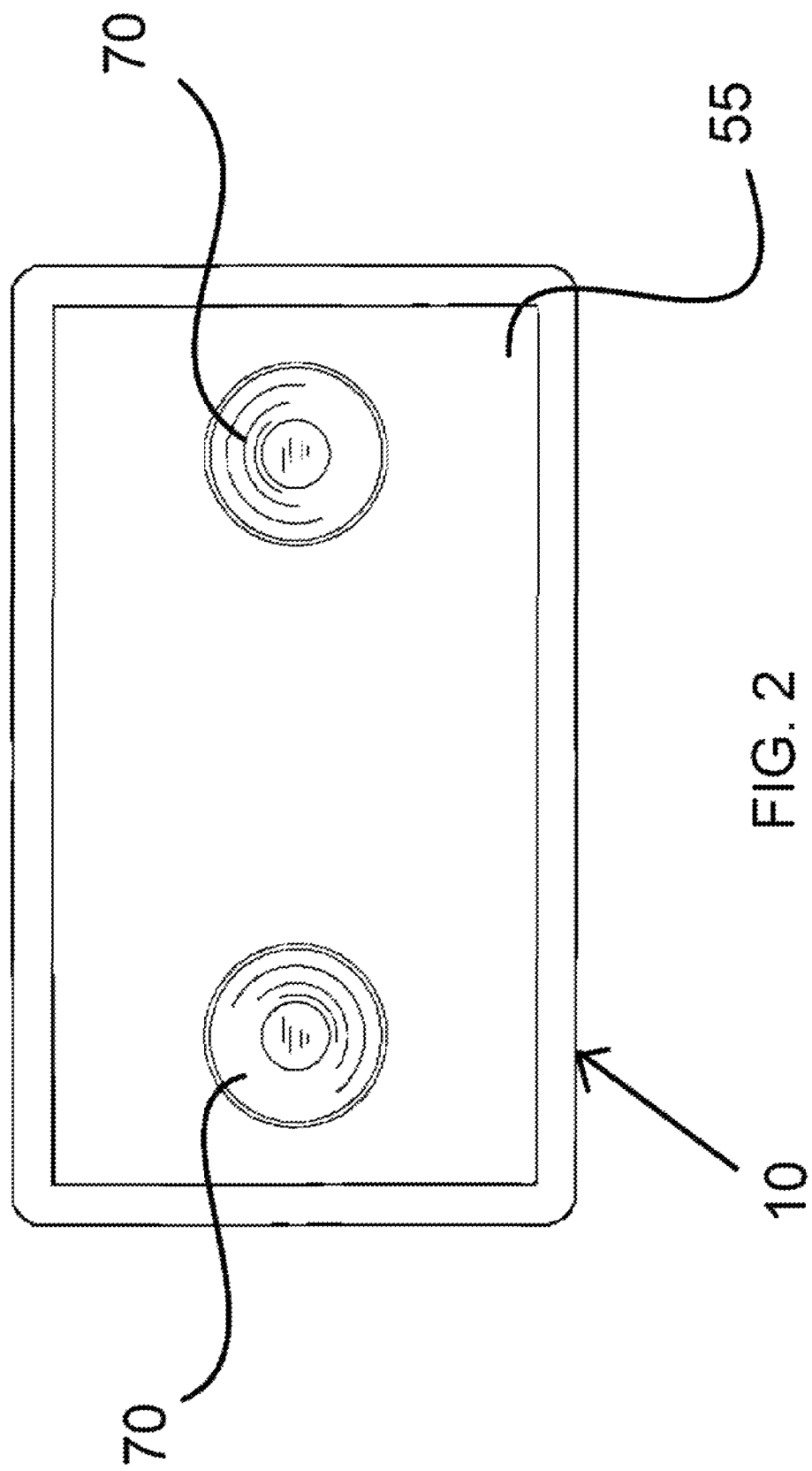
FIG. 2 displays a view of the bottom of the present invention, detailing the mounts present at the bottom of the base.
Figure 3:
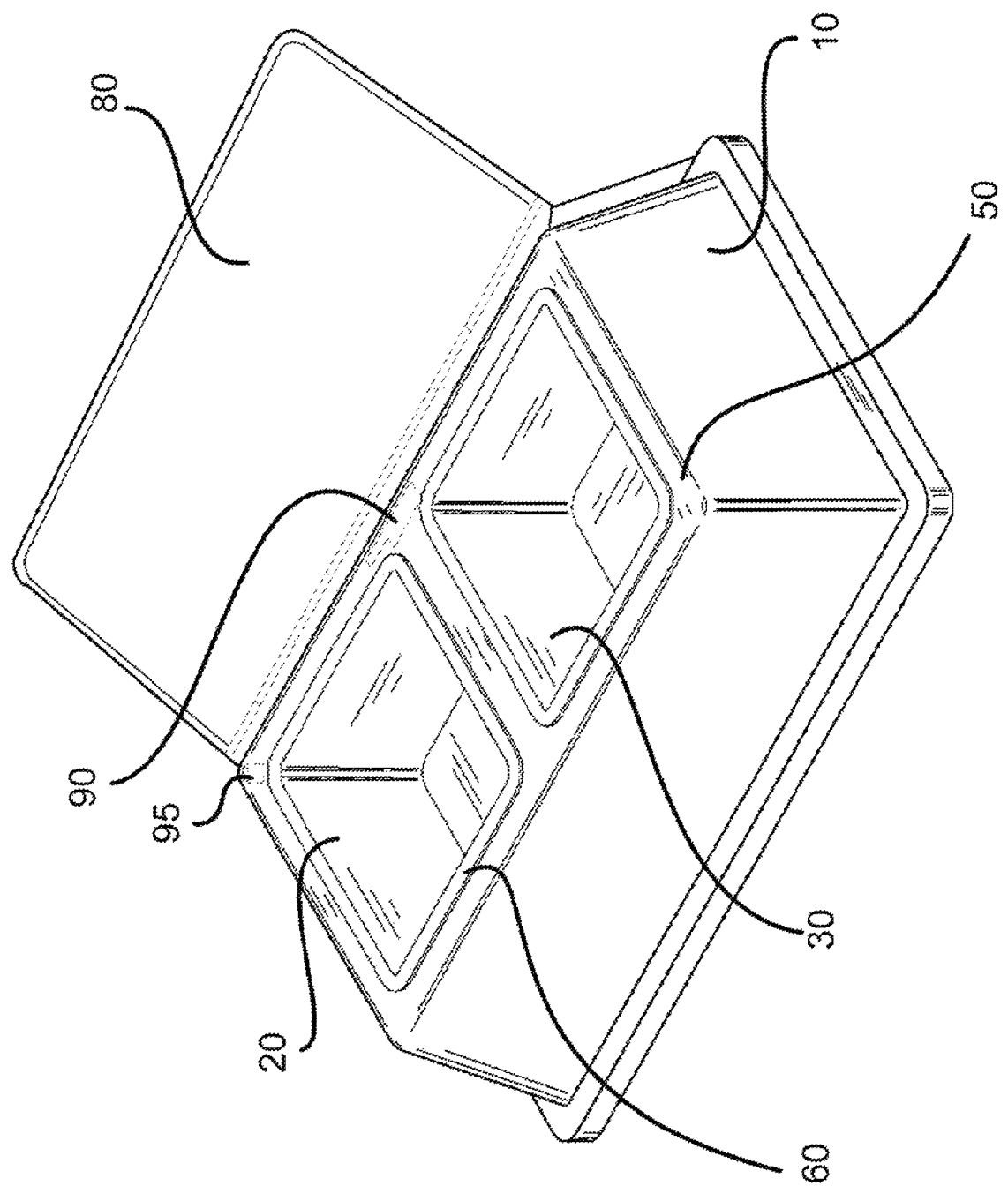
FIG. 3 exhibits a view of the apparatus of the present invention as seen from the top and side, with the bowls disposed within the cavities and the lid in the open position.

The present invention is a pet bowl system and apparatus configured for use to provide food and water to pets. The preferred embodiment of the present invention includes a primary base (10), first removable bowl (20), and a second removable bowl (30). The primary base (10) has a top portion (50) and a bottom portion (55). The primary base (10) is equipped with cavities (40) configured to receive the first removable bowl (20) and second removable bowl (30) such that tops (60) of the bowls (10, 20) rests flush with the top portion (50) of the primary base (10) when installed as shown in FIG. 2. Optionally, magnetic strips (95) may be present within the cavities (40) of the primary base (10) to ensure retention of the first removable bowl (20) and second removable bowl (30) when they are disposed within the cavities (40) of the primary base (10).

The bottom portion (55) of the primary base (10) itself is preferably configured to mate with a removable secondary base (15) which is equipped with at least one mount (70) configured to securely maintain both the removable secondary base (15) and the primary base (10) in a stationary position when mated together. In the preferred embodiment of the present invention, it is envisioned that the at least one mount (70) may be adjusted in accordance with the user's placement of the apparatus. As such, if the apparatus is to be disposed outdoors, the at least one mount (70) installed are ground spikes or stakes configured to securely mount the secondary base (15) to the ground such that the pet cannot move the primary base (10) when the primary base (10) and secondary base (15) are connected. Conversely, if the present invention is to be disposed indoors, the at least one mount (70) is preferably suction cups configured to securely mount and maintain the secondary base (15) of the apparatus to a floor of the home or office. The secondary base (15) is smaller in area than that of the footprint of the primary base (10), allowing for the secondary base (15) to fit snugly within the bottom portion (55) of the primary base (10) via a removable, friction-based press fitting.

Figure 5:
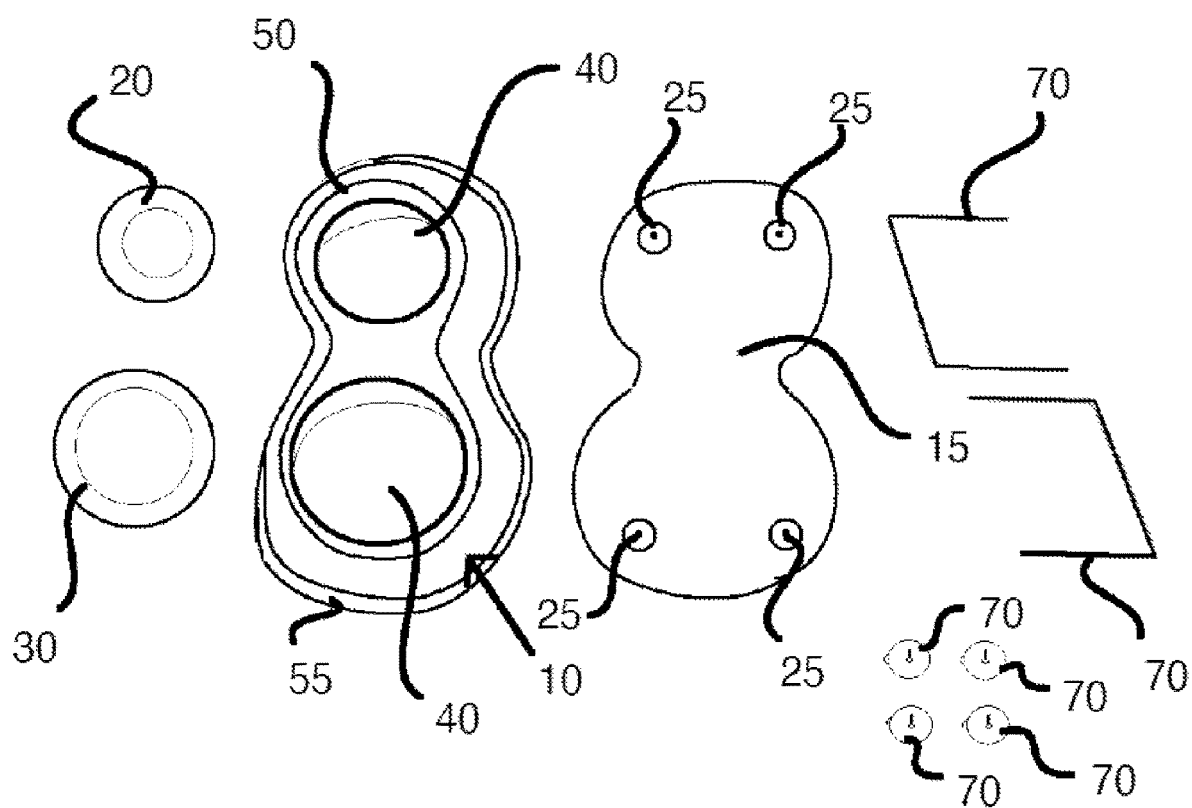
FIG. 5 depicts an embodiment of the present invention detailing the implementation of the ground spikes and/or suction cups as adhered to the removable base of the present invention.

Other mounting mechanisms may be employed in accordance with the demands of the environment. For example, if the flooring of the interior of the home or office is not smooth enough for suction cups to be effective, hook-and-loop fasteners, screws, or other known mounting mechanisms may be employed in lieu of (or in addition to) suction cups. Regardless of the form of the at least one mount (70), the at least one mount (70) is configured to be affixed to the secondary base (15) via holes (25) present on the secondary base (15). The holes (25) are preferably threaded to enable secure attachment of suction cups which are affixed to a screw as shown in FIG. 5.

Additionally, the top portion (50) of the base (10) is preferably equipped with a lid (80). The lid (80) is preferably disposed in communication with at least one electric motor (90) which is configured to facilitate the opening and closing of the lid (80) when called upon by an RFID reader (95) configured to detect the presence of RFID chips. The RFID chips are preferably disposed on the pet(s) collar to facilitate the automated opening of the lid (80) as the pet(s) approach the apparatus. It is envisioned that, in the preferred embodiment of the present invention, the lid (80) preferably extends across the entirety of both the first bowl (20) and second bowl (30) such that both bowls (20, 30) are uncovered and/or covered simultaneously via the lid (80). The electric motor (90) is preferably powered via a DC power source, however it may be configured to be powered via AC as well.

Figure 4:
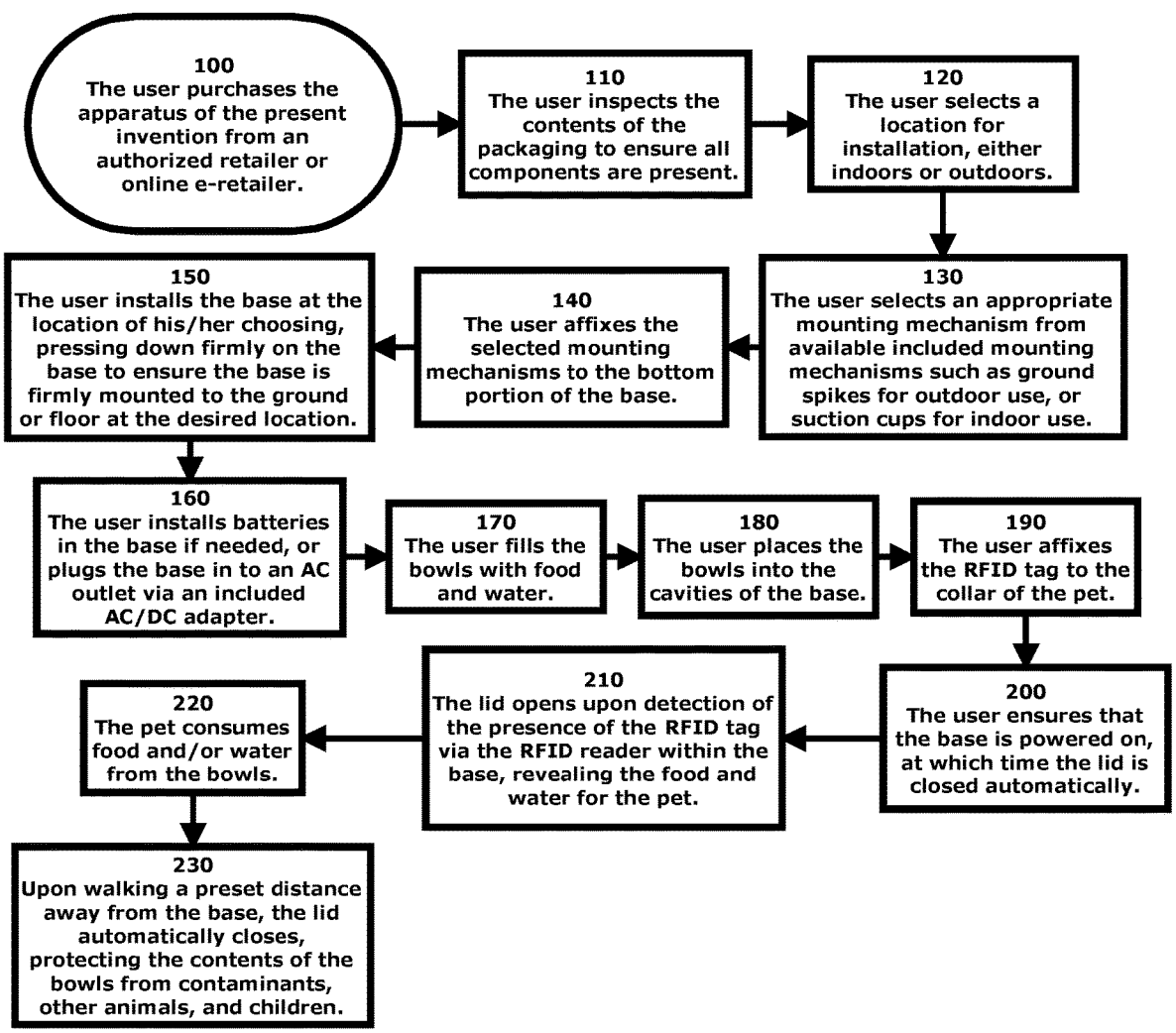
FIG. 4 shows a flow chart detailing the process of use of the present invention by a user.

The process of installation and use of the system and apparatus of the present invention, as shown in FIG. 4, is preferably as follows:

1. The user purchases the apparatus of the present invention from a retailer or authorized e-retailer. (100)
2. The user inspects the contents of the packaging to ensure all components are present. (110)
3. The user selects a location for installation, either indoors or outdoors. (120)
4. The user selects an appropriate mounting mechanism from available included mounting mechanisms such as ground spikes for outdoor use, or suction cups for indoor use. (130)
5. The user affixes the selected mounting mechanisms to the bottom portion of the secondary base. (140)
6. The user installs the secondary base at the location of his/her choosing, pressing down firmly on the secondary base to ensure the secondary base is firmly mounted to the ground or floor at the desired location. (150) The primary base is then placed within a recession of the secondary base, and pressed into position via a friction fit.
7. The user installs batteries in the base if needed, or plugs the base in to an AC outlet via an included AC/DC adapter. (160)
8. The user fills the bowls with food and water. (170)
9. The user places the bowls into the cavities of the primary base. (180)
10. The user affixes the RFID tag to the collar of the pet. (190)
11. The user ensures that the primary base is powered on, at which time the lid is closed automatically. (200)
12. The lid opens upon detection of the presence of the RFID tag via the RFID reader within the base, revealing the food and water for the pet. (210)
13. The pet consumes food and/or water from the bowls. (220)
14. Upon walking a preset distance away from the base, the lid automatically closes, protecting the contents of the bowls from contaminants, other animals, and children. (230)

It should be noted that the bowls (20, 30) of the present invention are preferably fashioned of stainless steel to make them easy to clean, as well as dishwasher safe. Additionally, stainless steel helps to ensure adhesion to the optional magnetic strips (90) within the cavities (40) of the base (10). The primary base (10) and secondary base (15) of the present invention are preferably made of a durable plastic such as PVC or PET, however alternate embodiments of the present invention may employ a variety of materials for the composition of the primary base (10).

In some embodiments of the present invention, the lid (80) is an optional component. As such, in these embodiments, the lid (80) may be purchased separately and installed to the top portion (50) and rear of the primary base (10) when desired. In such embodiments, the lid (80) is preferably a complete module which includes the RFID reader, motor, and power source which helps to keep the initial price of the primary base (10), secondary base (15) and bowls (20, 30) alone as low as possible.

In some alternate embodiments of the present invention, the lid (80) may be configured to open sideways. In other embodiments, there may be two separate lids (80), one for each bowl (20, 30). It is envisioned that the user may be able to adjust the proximity trigger distance of the RFID reader

(95) so as to enable opening of the lid (80) in a variety of distances from the RFID chip. However, the default distance setting is preferably 3-4 feet away from the pet wearing the RFID chip. It should be understood that the present invention may be bundled with multiple RFID tags so that households with multiple pets can use the same bowl system. Alternately, additional RFID tags compatible with the RFID reader (95) of the present invention may be purchased separately.

It should be noted that the at least one mount (70) of the present invention is preferably removably affixed to the bottom of the secondary base (15) as shown in FIG. 5. The at least one mount (70) is preferably present at four places of the bottom of the secondary base (15), ensuring adequate stability of the apparatus when affixed to the ground or floor. The at least one mount (70) may be exchanged for other iterations of mounts, including, but not limited to suction cups and ground spikes as previously stated.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A pet feeding and hydrating apparatus comprising:
   a primary base, said primary base equipped with a first cavity and a second cavity, said first cavity and said second cavity present on a top of said primary base;
   a secondary base, said secondary base configured to removably mount to a bottom of said primary base, said secondary base of similar size to said primary base, said secondary base smaller than said primary base;
   wherein said secondary base is configured to fit within the bottom portion of said primary base;
   said primary base configured to fit within a recession of said secondary base;
   said primary base configured to be pressed into said secondary base via friction fit;
   at least one mount, said at least one mount disposed in communication with a bottom of said secondary base;
   wherein said primary base is wider than said secondary base;
   wherein said primary base is rectangular;
   a first pet bowl, said first pet bowl removably disposed within said first cavity;
   a second pet bowl, said second pet bowl removably disposed within said second cavity;
   wherein said first pet bowl and said second pet bowl are composed of stainless steel;
   wherein said primary base ensures said first bowl and said second bowl remain stationary even when pushed by the pet when said primary base is affixed to said secondary base; and
   wherein said at least one mount of said secondary base secures said bottom of said secondary base to a ground or floor.

2. The apparatus of claim 1, wherein said at least one mount is at least one ground spike.

3. The apparatus of claim 1, wherein said at least one mount is at least one suction cup.

4. The apparatus of claim 1, wherein said at least one mount is a hook and loop fastener.

5. The apparatus of claim 2, wherein said at least one ground spike may be exchanged for at least one suction cup for mounting said secondary base indoors on a flat surface.

6. The apparatus of claim 3, wherein said at least one suction cup may be exchanged for at least one spike for mounting said secondary base outdoors on the ground.

7. The apparatus of claim 1, wherein said primary base is hourglass-shaped and said secondary base is hourglass-shaped.

8. The apparatus of claim 1, wherein said at least one mount is configured to securely mount the secondary base to secure said first pet bowl and said second pet bowl to the ground and to prevent the movement of the primary base.

9. The apparatus of claim 1, further comprising:
   a lid, said lid configured to cover said first pet bowl and said second pet bowl.

10. The apparatus of claim 9, further comprising:
    an electric motor, said electric motor disposed in communication with said lid;
    wherein said electric motor is disposed within said primary base;
    an RFID reader, said RFID reader configured to read RFID tags; and
    wherein said electric motor is configured to open said lid upon said RFID reader detecting and reading an RFID tag.

11. The apparatus of claim 10, wherein said electric motor is configured to close said lid upon said RFID reader failing to detect an RFID tag.

12. A method of protecting contents of pet bowls designated for at least one authorized pet from being accessed by unauthorized animals comprising:
    disposing a secondary base securely in a location via mounts;
    wherein said secondary base is equipped with a lid disposed in communication with an electric motor, an RFID reader, and a power source;
    disposing a primary base atop said secondary base;
    wherein said secondary base is smaller than said primary base;
    wherein said secondary base is configured to fit within the bottom portion of said primary base;
    wherein said primary base configured to fit within a recession of said secondary base;
    said primary base configured to be pressed into said secondary base via friction fit;
    disposing a first pet bowl into a first cavity of said primary base;
    disposing a second pet bowl into a second cavity of said primary base;
    placing the contents into the first pet bowl and the second pet bowl;
    manually closing the lid;

the at least one authorized pet approaching the primary base, the authorized pet wearing a collar equipped with an RFID tag;
the RFID reader detecting and reading the RFID tag;
the RFID reader signaling to the electric motor to open the lid, revealing the contents;
the at least one authorized pet consuming the contents;
the at least one authorized pet departing from the primary base;
the RFID reader failing to detect the RFID tag; and
the RFID reader signaling to the electric motor to close the lid.

13. The method of claim 12, further comprising:
the unauthorized animal approaching the primary base;
the RFID reader failing to read an RFID tag; and
the lid failing to open.

14. A pet bowl protection apparatus for at least one pet comprising:
a secondary, said secondary base equipped with mounts, an RFID reader, an electric motor, and a lid;
a primary base, said primary base housed atop said secondary base;
wherein said secondary base is smaller than said primary base;
wherein said secondary base is configured to fit snugly within the bottom portion of said primary base;
wherein said primary base configured to fit within a recession of said secondary base;
said primary base configured to be pressed into said secondary base via friction fit;
a first pet bowl and a second pet bowl, said first pet bowl disposed within a first cavity and said second pet bowl disposed within a second cavity;
wherein said first cavity and said second cavity are present within said primary base;
at least one RFID tag, said at least one RFID tag configured to be disposed on the at least one pet;
wherein said lid is solely configured to upon via said electric motor when said at least one RFID tag is read by said RFID reader; and
wherein said lid pivots about a hinge to open and close.

15. The apparatus of claim 14, wherein said lid is configured to close and remain closed via said electric motor when said RFID reader fails to read said at least one RFID tag.

* * * * *